United States Patent
Schneider

(10) Patent No.: US 9,063,948 B2
(45) Date of Patent: Jun. 23, 2015

(54) VERSIONING FILE SYSTEM

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 609 days.

(21) Appl. No.: 12/324,766

(22) Filed: Nov. 26, 2008

(65) Prior Publication Data

US 2010/0131477 A1 May 27, 2010

(51) Int. Cl.
*G06F 17/30* (2006.01)
*G06F 15/16* (2006.01)

(52) U.S. Cl.
CPC ...... *G06F 17/3023* (2013.01); *G06F 17/30067* (2013.01)

(58) Field of Classification Search
CPC .............. G06F 17/3023; G06F 17/30067
See application file for complete search history.

(56) References Cited

U.S. PATENT DOCUMENTS

| | | | | |
|---|---|---|---|---|
| 5,761,677 A | * | 6/1998 | Senator et al. | 1/1 |
| 7,650,341 B1 | * | 1/2010 | Oratovsky et al. | 707/999.01 |
| 7,870,356 B1 | * | 1/2011 | Veeraswamy et al. | 711/162 |
| 8,117,160 B1 | * | 2/2012 | Tang et al. | 707/639 |
| 8,285,758 B1 | * | 10/2012 | Bono et al. | 707/822 |
| 2001/0013040 A1 | * | 8/2001 | Baumeister et al. | 707/201 |
| 2002/0078244 A1 | * | 6/2002 | Howard | 709/248 |

* cited by examiner

*Primary Examiner* — Tarek Chbouki
(74) *Attorney, Agent, or Firm* — Lowenstein Sandler LLP

(57) ABSTRACT

An apparatus and a method for versioning a file of a file system is described. A versioning module stores multiple versions of the file. The file is opened for write access. The versioning module identifies an file mapping structure of a block associated with the file, copies the content of the file mapping structure of the file to a new file mapping structure of the file, and allocates a new block to the file as represented by the file mapping structure.

14 Claims, 5 Drawing Sheets

VERSIONING FILE SYSTEM

TECHNICAL FIELD

Embodiments of the present invention relate to computing systems, and more particularly, to storing multiple versions of a file.

BACKGROUND

An inode, in a UNIX-based filesystem, is a data structure used to store information, such as metadata, about a file, whereas data blocks are structures used to store the actual data for the file. The information contained in an inode may include ownership of the file, access permission for the file, size of the file, file type and references to locations on disk of the data blocks for the file. The references to the locations of the file data are provided by pointers in the inode, which may further reference indirect blocks that, in turn, reference data blocks, depending on the quantity of data in the file. Changes to the inodes and data blocks are made "in-place" in accordance with the write in-place file system. If an update to a file extends the quantity of data for the file, an additional data block is allocated and the appropriate inode is updated to reference that data block.

The storage of multiple versions of a file can take up a lot of precious storage space. Conventionally, each versions of the file is stored separately.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for versioning a file of a file system. A versioning module stores multiple versions of the file. The file is opened for write access. The versioning module identifies an inode of a block associated with the file, copies the content of the inode of the file to a new inode, and allocates a new block to the file as represented by the inode.

Those of ordinary skills in the art will recognize that the concept presented in this application is not solely limited to UNIX-based operating system but may also be applicable to other operating file systems.

Figure 1:
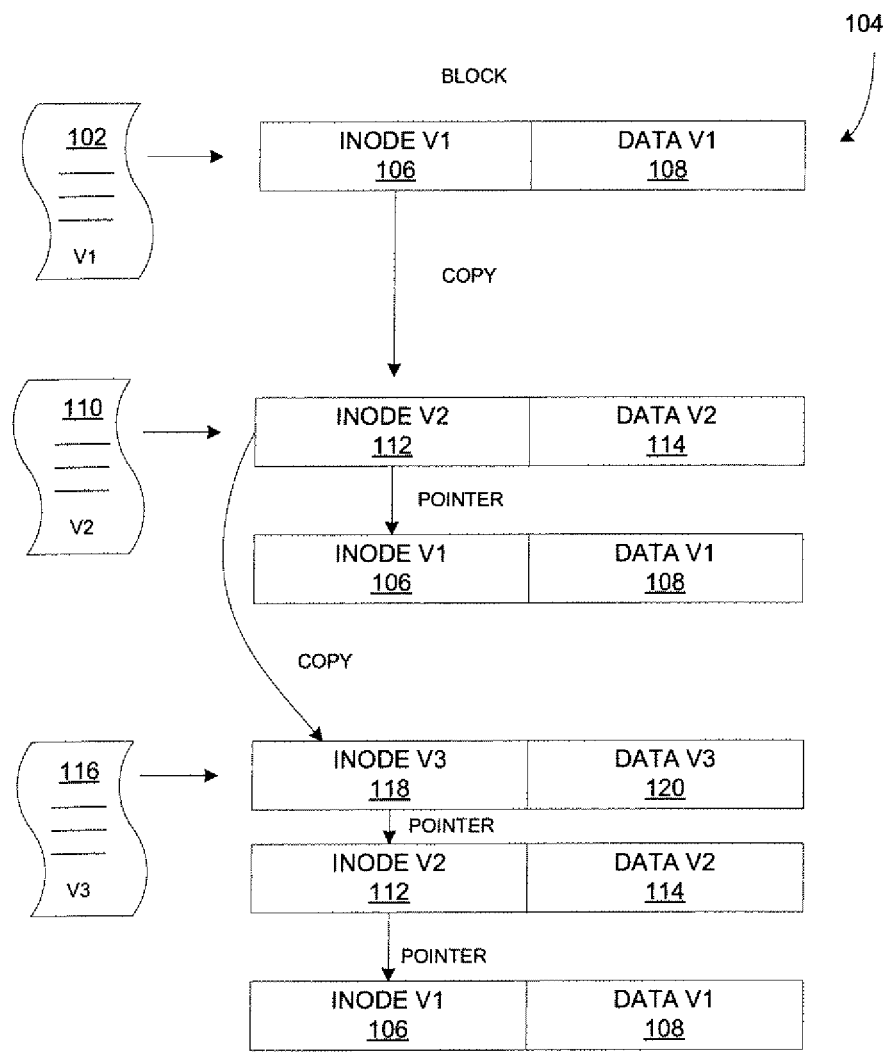
FIG. 1 is a block diagram illustrating one embodiment of a method for versioning a file in a file system.

UNIX-type file systems manage files using a structure called an inode, which contains almost all of the important information about a file (the only thing not stored in the inode is the file's name). To accomplish versioning, the contents of this inode are copied into a new inode whenever a file is open for write access. An inode is allocated to the file and blocks are allocated to the file in separate operations. As blocks are written, instead of overwriting what is in the existing blocks, new blocks get allocated to the file, as represented by the original inode. FIG. 1 is a block diagram illustrating one embodiment of the process of versioning a file in a file system. A first version 102 of a file is stored in a block 104 including an inode 106 and a first version of data block 108. When the file is open for write access, a second version 110 of the file is created. The content of inode v1 106 is copied into a new inode v2 112. A new data block 114 is allocated to the file. Inode v2 112 points to a prior version of the inode: inode v1 106.

The new and old version of the inode are to be associated in both directions. If this is being implemented as a modification of an existing file system, either two fields in the existing inode structure can be repurposed to support this, or they can be maintained in a separate mapping structure as described further below.

When the file is open for write access, another version 116 of the file is created. The content of inode v2 112 is copied into a new inode v3 118. A new data block 120 is allocated to the file. Inode v3 118 points to a prior version of the inode: inode v2 112 which in turn points to inode v1 106.

In the prior art, a pre-existing file is opened by following these steps:

1) The filesystem driver reads directories until it finds the file being referenced (for example, opening/var/log/messages would require that the filesystem find the "var" entry in the "/" directory, the "log" entry in the "/var" directory, and, finally, the "messages" entry in the "/var/log" directory).

2) The filesystem driver reads the directory entry and extracts the inode number (this is typically stored as 32 bit or 64 bit unsigned integer in the directory entry).

3) The filesystem driver reads the inode, based on the inode number found in step #2.

4) The filesystem driver uses the read-in inode information to create a kernel file structure, and passes an opaque reference to this structure back to the process requesting the file open operation.

This is the same for both reading and writing—the only difference being how the kernel file structure is set up. For the versioning filesystem, starting after step 3 (assuming a write operation), the steps are:

4) The filesystem driver allocates a new, unallocated inode, and copies the contents of the inode read in step 3 to the new inode, updating the "previous inode" pointer of the inode from step 3 to this new inode, and the new inode's "more recent" pointer to the inode from step 3.

5) If the inode from step 3 originally had a previous inode, that previous inode is read into memory, it's "more recent" pointer is updated to point to the inode allocated in step 4, and the inode read in this step is written back to secondary store (eg, the disk).

6) The filesystem driver uses the read-in inode information from step 3 to create a kernel file structure, passing an opaque reference to the requesting process.

Figure 2:
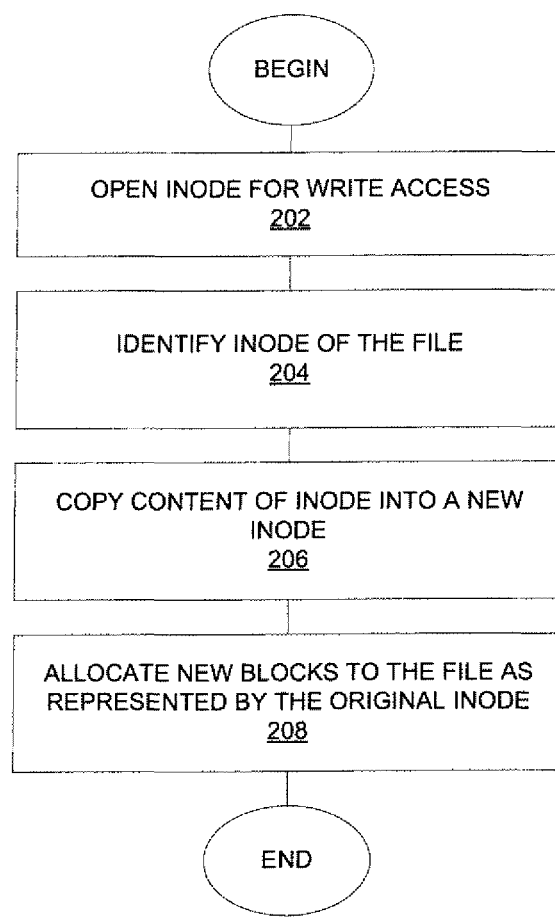
FIG. 2 is a flow diagram illustrating one embodiment of a method for versioning a file in a file system.

FIG. 2 is a flow diagram illustrating one embodiment of a method for versioning a file in a file system. At 202, the filesystem driver allocates a new, unallocated inode, and copies the contents of the inode read in step 3 to the new inode, updating the "previous inode" pointer of the inode from step 3 to this new inode, and the new inode's "more recent" pointer to the inode from step 3. At 204, if the inode from step 3 originally had a previous inode, that previous inode is read into memory, it's "amore recent" pointer is updated to point to the inode allocated in step 4, and the inode read in this step is written back to secondary store (eg, the disk). At 206, the filesystem driver uses the read-in inode information from step 3 to create a kernel file structure, passing an opaque reference to the requesting process.

In another embodiment, a field in the inode is updated to link the new inode to a previous inode version. Each block is associated with a corresponding bitmap, with a set bit from the bitmap indicating that the block belongs only to a prior version inode.

In another embodiment, a list of pointers to a corresponding prior version inode is maintained and ordered by access time.

When a block belonging to a prior version inode is repurposed, the prior version inode is deleted. The list of pointers is updated in response to the deletion of the prior version inode.

In another embodiment, an open operation on a specific version of a file is received. The specific version of the file is tracked using the list of pointers. A version history information of the file is also provided. Prior versions blocks are deleted in response to a number of free blocks in the file system being less than a predetermined threshold.

Figure 3:
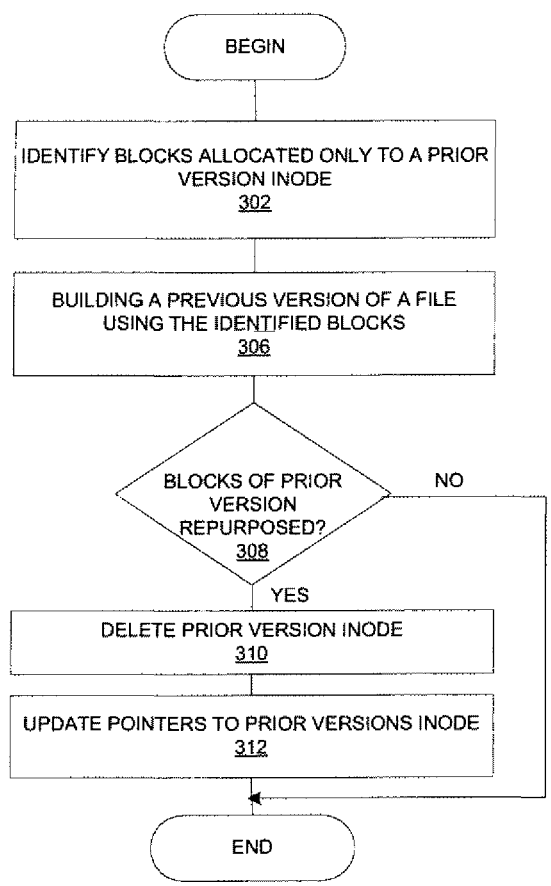
FIG. 3 is a flow diagram illustrating one embodiment of a method for retrieving a previous version of a file in a file system.

FIG. 3 is a flow diagram illustrating one embodiment of a method for retrieving a previous version of a file in a file system. To support being able to reuse blocks belonging to backups, in the event that the filesystem fills up, blocks that are allocated only to a prior version inode need to be tracked. One way to do it would be to use a bitmap, with each block corresponding to a single bit, with a set bit indicating that the block belongs only to a prior version inode. In concert with this, pointers to the prior version inodes should be kept in a list, ordered by access time. If the filesystem needs to find a block to allocate, it can walk through the list of prior version inodes from least recently to most recently accessed, checking the blocks belonging to it against the bitmap At 302, blocks allocated only to a prior version inode are identified. At 304, a previous version of a file is built using the identified blocks.

At 306, a determination is made as to whether blocks belonging to a prior version inode are repurposed. If they are, the inode itself is deleted at 310 and its parent is updated to point to its own prior version inode (if any), which is in turn updated to point to the parent at 312.

In another embodiment, the filesystem driver can be extended to allow a specific version of a file to be specified when an open operation is attempted, and to provide version history information. This can be extended to any file change (the inode is always backed up before it is changed), but for heavily accessed files, this may result in a truly huge number of inode backups (the time of last access is one of the fields in a typical inode, and it tracks the last time a file was closed, whether it was opened for reading or writing).

The freeing of prior version owned blocks probably needs to be done in a critical section, or perhaps the filesystem could be locked to a single cpu, in SMP environments. Also, harvesting blocks from old prior versions can be done by a daemon process whenever the number of free blocks gets below a predetermined threshhold.

Figure 4:
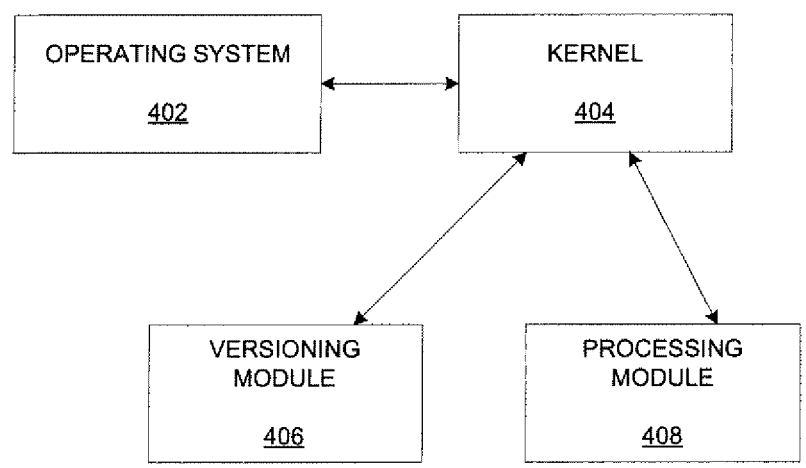
FIG. 4 is a block diagram illustrating one embodiment of logical components of a computer system.

FIG. 4 is a block diagram illustrating one embodiment of logical components of a computer system. A UNIX based operating system 402 includes a file system having software for controlling the transfer of data. A kernel module 404 communicates with the OS 402 to maintain various system services such as memory management, timer, synchronization, and task creation. A versioning module 406 and a processing module 408 interact with the kernel module 404 to carry out block versioning and processing operations as previously described. Versioning module 406 and processing module 408 may either be integral to OS 402 or operate as independent modules and may be implemented in hardware and/or software.

Figure 5:
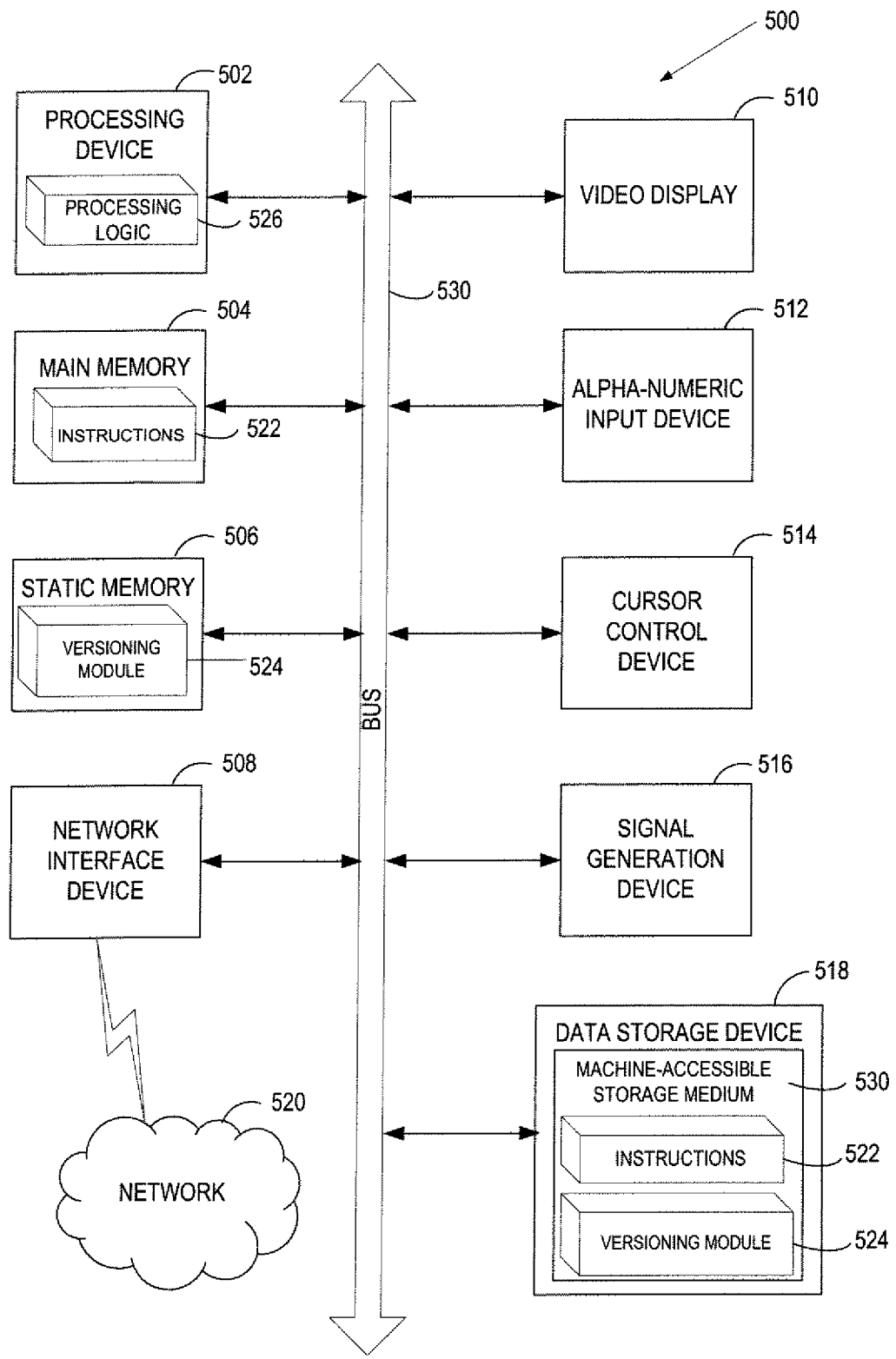
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute modules 526 (previously described with respect to FIG. 1) for performing the operations and steps discussed herein with. In one embodiment, the modules may be include hardware or software or a combination of both.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting computer-accessible storage media. The software 522 may further be transmitted or received over a network 520 via the network interface device 508.

The computer-accessible storage medium 530 may also be used to store the versioning module 524 as presently described. The versioning module 524 may also be stored in other sections of computer system 500, such as static memory 506.

While the computer-accessible storage medium 530 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
associating a first version of a file with a first file mapping structure and a first data block;
creating a second version of the file in response to a first opening, by a processing device, of the file for write access;
allocating, by the processing device, a second file mapping structure and a second data block to the second version of the file and copying content of the first file mapping structure to the second file mapping structure;
updating a pointer of the second file mapping structure to point to the first file mapping structure;
updating a pointer of the first file mapping structure to point directly to the second file mapping structure, wherein the first file mapping structure and the second file mapping structure are associated to each other in two directions and create two versions of the file;
associating, by the processing device, each of the first data block and the second data block to a corresponding bitmap, with a set bit in the corresponding bitmap indicating whether the corresponding data block belongs only to a prior version file mapping structure;
maintaining a list of the pointers ordered by a respective access time; and
reviewing the list in an order of least recently accessed to most recently accessed and the bitmap to identify a data block to repurpose.

2. The method of claim 1 further comprising:
updating a field in the second file mapping structure to link the second file mapping structure to the first file mapping structure.

3. The method of claim 1 further comprising:
repurposing a data block belonging to a prior version file mapping structure;
deleting the prior version file mapping structure; and
updating the list of pointers in response to the deletion of the prior version file mapping structure.

4. The method of claim 1, further comprising:
receiving an open operation on a specific version of the file;
tracking the specific version of the file using the list of pointers; and
providing a version history information of the file.

5. The method of claim 1, further comprising:
deleting prior version data blocks in response to a number of free data blocks in the file system being less than a predetermined threshold, wherein the prior version data blocks correspond to at least one of the first data block or the second data block.

6. A non-transitory computer-readable storage medium, having instructions stored therein, which when executed, cause a processing device to:
associate a first version of a file with a first file mapping structure and a first data block;
create a second version of the file in response to a first opening, by the processing device, of the file for write access;
allocate, by the processing device, a second file mapping structure and a second data block to the second version of the file and copying content of the first file mapping structure to the second file mapping structure;
update a pointer of the second file mapping structure to point to the first file mapping structure;
update a pointer of the first file mapping structure to point directly to the second file mapping structure, wherein the first file mapping structure and the second file mapping structure are associated to each other in two directions and create two versions of the file;
associate, by the processing device, each of the first data block and the second data block to a corresponding bitmap, with a set bit in the corresponding bitmap indicating whether the corresponding data block belongs to a prior version file mapping structure;
maintain a list of the pointers ordered by a respective access time; and
review the list in an order of least recently accessed to most recently accessed and the bitmap to identify a data block to repurpose.

7. The non-transitory computer-readable storage medium of claim 6, the processing device to:
update a field in the second file mapping structure to link the second file mapping structure to the first file mapping structure.

8. The non-transitory computer-readable storage medium of claim 6, the processing device to:
repurpose a data block belonging to a prior version file mapping structure;
delete the prior version file mapping structure; and
update the list of pointers in response to the deletion of the prior version file mapping structure.

9. The non-transitory computer-readable storage medium of claim 6, the processing device to:
receive an open operation on a specific version of the file;
track the specific version of the file using the list of pointers; and
provide a version history information of the file.

10. The non-transitory computer-readable storage medium of claim 6, the processing device to:
delete prior version data blocks in response to a number of free data blocks in the file system being less than a predetermined threshold, wherein the prior version data blocks correspond to at least one of the first data block or the second data block.

11. A computer system comprising:
a memory to store a first file mapping structure and a second file mapping structure;
a processing device operatively coupled to the memory to:
associate a first version of a file with the first file mapping structure and a first data block,
create a second version of the file in response to a first opening of the file for write access,
allocate the second file mapping structure and a second data block to the second version of the file, copy content of the first file mapping structure to the second file mapping structure,
update a pointer of the second file mapping structure to point directly to the first file mapping structure,
create a third version of the file in response to a second opening the file for write access update a pointer of the first file mapping structure to point to the second file mapping structure, wherein the first file mapping structure and the second file mapping structure are associated to each other in two directions and create two versions of the file,
associate each of the first data block and the second data block to a corresponding bitmap, with a set bit in the corresponding bitmap indicating whether the corresponding data block belongs to a prior version file mapping structure;
maintain a list of the pointers ordered by a respective access time; and
review the list in an order of least recently accessed to most recently accessed and the bitmap to identify a data block to repurpose.

12. The computer system of claim 11, the processing device to update a field in the second file mapping structure to link the second file mapping structure to the first file mapping structure.

13. The computer system of claim 11, the processing device to repurpose a data block belonging to a prior version file mapping structure, delete the prior version file mapping structure, and update the list of pointers in response to the deletion of the prior version file mapping structure.

14. The computer system of claim 11, the processing device to receive an open operation on a specific version of the file, track the specific version of the file using the list of pointers, provide a version history information of the file, and delete prior version data blocks in response to a number of free data blocks in the file system being less than a predetermined threshold.

* * * * *